UNITED STATES PATENT OFFICE.

SAMUEL MALLARD, OF STATEN ISLAND, NEW YORK.

IMPROVEMENT IN DYEING.

Specification forming part of Letters Patent No. 6,242, dated March 27, 1849.

*To all whom it may concern:*

Be it known that I, SAMUEL MALLARD, of Staten Island, in the county of Richmond and State of New York, have invented a new and useful Process and Composition of Materials for Dyeing Fabrics; and I do hereby declare the following to be a full, clear, and exact description of the same.

The nature of my invention consists in preparing and using dyes for the purpose of dyeing fabrics in a raw or a manufactured state, the same being intended to produce what is termed "prussian-blue dye," including the various shades of blue, green, lavender, purple, plum, brown, &c. This will dye wool and woolen goods, cotton and cotton goods, silk and silk goods, linen and linen goods, as well as all other fabrics, particularly animal productions.

My jetamallar or prussian-blue dye is prepared as follows: For a middle shade of color take a wooden vessel, and having prepared one hundred parts (100 lbs.) of wool, cloth, or goods made from wool, and a sufficiency of water, the water is to be heated by steam to 125° Fahrenheit, at which heat put in one and one-fourth part (1¼ lb.) of nitrate of potash, or nitrate of soda as a substitute. To this add one and one-fourth part (1¼ lb.) muriate of soda, or as substitute muriatic acid. Next add five parts (5 lbs.) of sulphuric acid, these being thoroughly mixed and at 125° Fahrenheit. The wool, cloth, or goods may be entered and remain ten minutes. At this time put in five parts (5 lbs.) of prussiate of potash, or prussiate of soda as a substitute, without taking out the goods, and increase the heat to 140° Fahrenheit, and run or continue it forty minutes more, or one hour in all, the heat being constantly increased until it arrives at a spring heat—that is, near a boil—and thus continued as long as the color improves, or, say, twenty or thirty minutes. The goods should then be removed from the liquid, after which it should be cooled down to 175° Fahrenheit, and at that degree of heat add one and a half part (1½ lb.) sulphuric muriate of tin, or as substitutes nitro-muriate of tin or other salt of like character. Mix the liquor well together, and again enter the goods for ten or twenty minutes, or as long as the color improves. After that take them out and wash them until perfectly clean. I vary the shade of color by reducing the liquors—that is, if a dark shade is required, the materials should be increased; if the contrary, they should be decreased. Log-wood should be used to deepen the color, and gives a rich blooming color, and should be used in quantity to suit the judgment and produce the desired shade, while cam-wood, bar-wood, Brazil-wood, peach-wood, &c., can be used so as to give the desired shade of color to the full variety, as before stated; but a fine dark green is produced when bichromite of potash is used.

It will be understood that when the nitrate of potash and muriate of soda come in contact with the sulphuric acid and water they produce a dilution of muriatic acid of a mild type, which is advantageous for its lack of destructive qualities, as it will fail to weaken the cloth, as such acid does when distilled previous to its application.

The salts may be mixed with the sulphuric acid and afterward put in the dye-vessel; but it is far preferable to operate as hereinbefore described, for be it understood that the sulphate of potash and sulphate of soda that are formed when the sulphuric acid and salts come in contact with each other form a mordant for the coloring-matter and answer the purpose of salmixon or red tartar.

The advantages of this method of making a dye are very great as regards two material facts: First, the colors thus produced will not crock, will stand washing with soap, and are very fast though not permanent colors to a positive degree, yet they are far more permanent than most any of the other dyes—that is, dyes prepared and used as heretofore; second, it is very much cheaper than dye, for these colors now known and in use for dyeing blues, greens, browns, plums, and such like shades and colors in full variety and of very bright and beautiful tints.

What I claim as my discovery, and desire to secure by Letters Patent, is—

The peculiar compound of nitrate of potash or nitrate of soda and muriate of soda with the sulphuric acid and coloring-matter, in manner and for the purpose herein described, by which I make a superior and much cheaper dye than has before been made to produce such colors in fabrics when dyed, in manner and for the purposes herein described and set forth.

SAMUEL MALLARD.

Witnesses:
J. L. KINGSLEY,
J. P. PIRSSON.